US012811780B2

(12) United States Patent
Sehrawat

(10) Patent No.: US 12,811,780 B2
(45) **Date of Patent: *Nov. 24, 2026**

(54) SECURITY AND EFFICIENCY FOR MULTI-PARTY COMPUTATION WALLETS

(71) Applicant: Circle Internet Group, Inc., New York, NY (US)

(72) Inventor: Vipin Singh Sehrawat, Fremont, CA (US)

(73) Assignee: Circle Internet Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/390,443

(22) Filed: Nov. 14, 2025

(65) Prior Publication Data

US 2026/0099838 A1 Apr. 9, 2026

Related U.S. Application Data

(63) Continuation of application No. 18/909,358, filed on Oct. 8, 2024.

(51) Int. Cl.
*H04L 9/08* (2006.01)
*G06Q 20/36* (2012.01)

(52) U.S. Cl.
CPC ....... *H04L 9/0838* (2013.01); *G06Q 20/3674* (2013.01); *G06Q 20/3678* (2013.01); *H04L 9/0816* (2013.01); *H04L 2209/46* (2013.01)

(58) Field of Classification Search
CPC ............ G06Q 20/3674; G06Q 20/3678; H04L 9/0816; H04L 9/0838; H04L 9/085; H04L 2209/46
See application file for complete search history.

(56) References Cited

U.S. PATENT DOCUMENTS 5,953,420 A * 9/1999 Matyas, Jr. ........... H04L 9/0844 713/171
8,549,299 B2 * 10/2013 Struik ................... H04L 9/0844 380/282

(Continued)

FOREIGN PATENT DOCUMENTS

CN 106533684 A 3/2017
WO WO 2022/047055 A1 3/2022

OTHER PUBLICATIONS

Ananth et. al., Unbounded Multi-party Computation from Learning with Errors, Cryptologic Research, 2021.*

(Continued)

*Primary Examiner* — David Garcia Cervetti
(74) *Attorney, Agent, or Firm* — Fish & Richardson P.C.

(57) ABSTRACT

Methods, systems, and apparatus for multiplicative to additive share conversions in MPC wallet protocols. In one aspect, a first party generates a graded encoding for a first secret value using a first LWE instance that comprises the first secret value. The first party receives a graded encoding for the second secret value from a second party in possession of a second secret value. The first party computes a product of: the graded encoding for the second secret value, the graded encoding for the first secret value, and a first public matrix generated by or assigned to the first party, where the product comprises a second additive secret value and forms a second LWE instance. The first party inverts the second LWE instance to compute a first additive secret value. The first party performs a cryptographic operation in an MPC wallet protocol using the first additive secret value.

14 Claims, 5 Drawing Sheets

(56) References Cited

U.S. PATENT DOCUMENTS

| | | | | | |
|---|---|---|---|---|---|
| 9,698,986 | B1 * | 7/2017 | Gutoski | H04L 9/3093 | |
| 10,103,886 | B1 * | 10/2018 | Gutoski | H04L 9/0838 | |
| 10,218,504 | B1 * | 2/2019 | Kalach | H04L 9/0819 | |
| 10,491,384 | B2 * | 11/2019 | French | H04L 9/0861 | |
| 10,924,287 | B2 * | 2/2021 | Hoffstein | H04L 9/3247 | |
| 11,316,673 | B2 * | 4/2022 | Sehrawat | H04L 9/3073 | |
| 11,362,816 | B2 * | 6/2022 | Sehrawat | H04L 9/085 | |
| 11,374,736 | B2 * | 6/2022 | Gao | H04L 9/3093 | |
| 11,405,200 | B1 * | 8/2022 | Hamel | H04L 9/0822 | |
| 11,917,062 | B2 * | 2/2024 | Sehrawat | H04L 9/008 | |
| 12,003,488 | B2 * | 6/2024 | Jain | H04L 63/083 | |
| 12,052,355 | B1 | 7/2024 | Sehrawat | | |
| 12,289,399 | B2 * | 4/2025 | Sehrawat | H04L 9/085 | |
| 2001/0034719 | A1 * | 10/2001 | Durand | G06Q 20/3674 | 705/72 |
| 2004/0062390 | A1 * | 4/2004 | Slavin | H04L 9/302 | 380/30 |
| 2010/0150343 | A1 * | 6/2010 | Rombouts | H04L 9/302 | 380/44 |
| 2013/0272521 | A1 * | 10/2013 | Kipnis | H04L 9/0869 | 380/44 |
| 2016/0204936 | A1 | 7/2016 | Sakemi et al. | | |
| 2016/0323097 | A1 * | 11/2016 | Medwed | H04L 9/0891 | |
| 2017/0147835 | A1 * | 5/2017 | Bacon | H04L 9/321 | |
| 2018/0007037 | A1 * | 1/2018 | Reese | H04L 63/0838 | |
| 2018/0337899 | A1 * | 11/2018 | Becker | H04L 63/0428 | |
| 2019/0020472 | A1 * | 1/2019 | Cho | H04L 9/3231 | |
| 2020/0044863 | A1 * | 2/2020 | Yadlin | G06F 9/54 | |
| 2020/0259651 | A1 * | 8/2020 | Mohassel | H04L 9/3218 | |
| 2020/0287712 | A1 * | 9/2020 | Macchetti | H04L 9/003 | |
| 2020/0304294 | A1 * | 9/2020 | Li | H04L 9/0637 | |
| 2020/0358601 | A1 * | 11/2020 | Gama | H04L 9/00 | |
| 2020/0403781 | A1 * | 12/2020 | Gentry | H04L 9/0618 | |
| 2021/0051010 | A1 | 2/2021 | Yang et al. | | |
| 2021/0126770 | A1 * | 4/2021 | Moon | H04L 9/0869 | |
| 2021/0359863 | A1 * | 11/2021 | Hung | H04L 9/50 | |
| 2022/0045865 | A1 * | 2/2022 | Mukherjee | H04L 9/3247 | |
| 2022/0085978 | A1 * | 3/2022 | Sehrawat | H04L 9/3218 | |
| 2022/0085979 | A1 * | 3/2022 | Sehrawat | H04L 9/3093 | |
| 2022/0103375 | A1 * | 3/2022 | El Kaafarani | H04L 9/14 | |
| 2022/0209950 | A1 * | 6/2022 | Gray | H04L 9/3263 | |
| 2022/0374904 | A1 * | 11/2022 | Vaculin | G06N 5/04 | |
| 2022/0399992 | A1 * | 12/2022 | Christensen | H04L 9/3255 | |
| 2023/0017542 | A1 * | 1/2023 | Khisti | G06N 20/00 | |
| 2023/0120202 | A1 * | 4/2023 | Yanai | H04L 9/3006 | 380/277 |
| 2023/0143175 | A1 * | 5/2023 | Sehrawat | G06F 17/16 | 380/278 |
| 2023/0291540 | A1 * | 9/2023 | Paillier | H04L 9/008 | |
| 2023/0315821 | A1 * | 10/2023 | Wee | G06F 21/14 | 726/26 |
| 2023/0361993 | A1 * | 11/2023 | Camenisch | H04L 9/085 | |
| 2024/0031130 | A1 * | 1/2024 | Roussellet | H04L 9/0631 | |
| 2024/0220973 | A1 * | 7/2024 | Yeshayahu | G06Q 20/40975 | |
| 2024/0259180 | A1 * | 8/2024 | Joye | H04L 9/008 | |
| 2024/0259191 | A1 * | 8/2024 | Li | H04L 9/3066 | |
| 2024/0267222 | A1 * | 8/2024 | Chillotti | H04L 9/008 | |
| 2024/0313949 | A1 | 9/2024 | Yeomans et al. | | |
| 2025/0005566 | A1 * | 1/2025 | Osborn | H04L 9/0861 | |
| 2025/0070968 | A1 * | 2/2025 | Sehrawat | H04L 9/0891 | |
| 2025/0175322 | A1 * | 5/2025 | Bourgerie | H04L 9/008 | |
| 2025/0193158 | A1 * | 6/2025 | Park | H04L 63/0428 | |
| 2025/0232271 | A1 * | 7/2025 | Knox | G06F 21/6245 | |
| 2025/0323785 | A1 * | 10/2025 | Yang | H04L 9/3093 | |
| 2025/0337567 | A1 * | 10/2025 | Lee | H04L 9/0618 | |
| 2026/0003633 | A1 * | 1/2026 | Wilkerson | G06F 9/3856 | |
| 2026/0039458 | A1 * | 2/2026 | Katsumata | H04L 9/085 | |
| 2026/0039599 | A1 * | 2/2026 | Malin | H04L 63/0227 | |
| 2026/0100853 | A1 | 4/2026 | Sehrawat | | |
| 2026/0100854 | A1 | 4/2026 | Sehrawat | | |

OTHER PUBLICATIONS

Mouchet et. al., Multiparty Homomorphic Encryption from Ring-Learning-with-Errors, SCLENDO, 2021.*

Farshim et. al., Graded Encoding Schemes from Obfuscation, Cryptologic Reasearch, 2021.*

Alamati et. al., Multiparty Noninteractive Key Exchange from Ring Key-Homomorphic Weak PRFs, Springer, 2023.*

Albrecht et. al., A subfield lattice attack on overstretched NTRU assumptions Cryptanalysis of some FHE and Graded Encoding Schemes, Crypto 2016, 2016.*

Shai Halevi, Graded Encoding, Variations on a Scheme, IBM, 2015.*

Cheon et. al., Fully Homomophic Encryption over the Integers Revisited, Eurocrypt 2015, 2015.*

Bitansky et al., On Removing Graded Encodings from Functional Encryption, International Association for Cryptologic Research 2017, 2017.*

Vipin Singh Sehrawat, Privacy Enhancing Cryptographic Constructs for Cloud and Distributed Security, The University of Texas at Dallas, Dec. 2019.*

Applebaum et al., "Arithmetic cryptography: Extended Abstract," ITCS '15: Proceedings of th 2015 Conference on Innovations in Theoretical Computer Science, Jan. 2015, pp. 143-151.

Applebaum et al., "On Pseudorandom Generators with Linear Stretch in NC0," Computational Complexity, Mar. 2008, 17(1):38-69.

Banerjee et al., "Pseudorandom Functions and Lattices," Euro-Crypt, 2012, pp. 719-737.

Barak et al., "On the (Im)possibility of Obfuscating Programs," Journal of the ACM (JCAM), 59(2):1-48.

Blum et al., "Cryptographic Primitives Based on Hard Learning Problems," Crypto '93, 1993, pp. 278-291.

Boyle et al., "Compressing vector OLE," CCS '18 Proceedings of the 2018 ACM SIGSAC Conference on Computer and Communications Security, Oct. 2018, 17 pages.

Brakerski et al., "Classical Hardness of Learning with Errors: Extended Abstract," STOC '13 Proceedings of the Forty-Fifth Aannual ACM Symposium on Theory of Computing, Jun. 2013, pp. 575-584.

Brakerski et al., "Worst-Case Hardness for LPN and Cryptographic Hashing via Code Smoothing," Eurocrypt 2019, Apr. 2019, pp. 619-635.

Canetti et al., "Uc noninteractive, proactive, threshold ecdsa with identifiable aborts," Cryptology ePrint Archive, Paper 2021/060, 2021, retrieved from URL<https://eprint.iacr.org/2021/060, doi:10.1145/3372297.3423367>, 77 pages.

Coron et al., "Cryptanalysis of GGH15 Multilinear Maps," Crypto 2016, 2016, pp. 607-628.

Doosti et al., "On the connection between quantum pseudorandomness and quantum hardware assumptions," Quantum Science and Technology, 2022, vol. 7, 035004, 25 pages.

Friedland et al., "Symmetric grothendieck inequality," CoRR, Submitted on Mar. 16, 2020, arXiv:2003.07345v1, 42 pages.

Gebali et al., "Review of physically unclonable functions (PUFs): Structures, models, and algorithms," Frontiers in Sensors, Jan. 11, 2022, vol. 2, Article 751748, 13 pages.

Gennaro et al., "Fast Multiparty Threshold ECDSA with Fast Trustless Setup," CCS '18 Proceedings of the 2018 ACM SIGSAC Conference on Computer and Communications Security, Oct. 15, 2018, pp. 1179-1194.

Gentry et al., "Graph-Induced Multilinear Maps from Lattices," Theory of Cryptography, 2015, pp. 498-527.

Goldwasser et al., "On best-possible obfuscation," Theory of Cryptography, 2007, pp. 194-213.

Grolmusz et al., "Superpolynomial size set-systems with restricted intersections mod 6 and explicit Ramsey graphs," Combinatorica, 2000, 20(1):71-85.

Jain et al., "Indistinguishability Obfuscation from LPN over Fp, DLIN, and PRGs in NC0," Advances in Cryptology—Eurocrypt 2022: 41st Annual International Conference on the Theory and Applications of Cryptographic Techniques, May 2022, pp. 670-699.

Jain, "Indistinguishability Obfuscation from Well-Studied Assumptions," Thesis for the degree of Doctor of Philosophy in Computer Science, University of California Los Angeles, 2021, 142 pages.

(56) References Cited

OTHER PUBLICATIONS

Jian et al., "Indistinguishability obfuscation from well-founded assumptions," STOC 2021: Proceedings of the 53rd Annual ACM SIGACT Symposium on Theory of Computing, Jun. 2021, pp. 60-73.
Lim, "Extracting secret keys from integrated circuits," Master's Thesis, Massachusetts Institute of Technology, May 2004, 119 pages.
Micciancio et al., "Trapdoors for Lattices: Simpler, Tighter, Faster, Smaller," Eurocrypt 2012, pp. 700-718.
Mossel et al., "On ϵ-biased generators in NC0," Proceedings of 44th Annual IEEE Symposium on Foundations of Computer Science, 2003, pp. 136-145 (10 pages).
Pappu et al., "Physical one-way functions," Science, Sep. 2002, 297(5589):2026-2030.
Peikert et al., "Pseudorandomness of Ring-LWE for Any Ring and Modulus," STOC 2017: Proceedings of the 49th Annual ACM SIGACT Symposium on Theory of Computing, Jun. 2017, pp. 461-473.
Peikert et al., "Public-Key Cryptosystems from the Worst-Case Shortest Vector Problem: Extended Abstract," STOC '09: Proceedings of the Forty-First Annual ACM Symposium on Theory of Computing, May 2009, pp. 333-342.
Regev, "On Lattices, Learning with Errors, Random Linear Codes, and Cryptography," STOC '05 Proceedings of the Thirty-Seventh Annual ACM Symposium on Theory of Computing, May 2005, pp. 84-93.
Rührmair et al., "Modeling attacks on physical unclonable functions," CCS '10 Proceedings of the 17th ACM Conference on Computer and Communications Secuirty, Oct. 2010, 13pages.
Rührmair et al., "PUF modeling attacks: An introduction and overview," Design, Automation & Test in Europe Conference & Exhibition (DATE), 2014, pp. 1-6.
Sehrawat et al., "Extremal set theory and LWE based access structure hiding verifiable secret sharing with malicious-majority and free verification," Theoretical Computer Science, Sep. 2021, 886:106-138.
Sehrawat et al., "Star-Specific Key-Homomorphic PRFs From Learning With Linear Regression," IEEE Access, Jul. 2023, 11:73235-73267.
Suegami, "Cryptographic obfuscation for smart contracts: Trustless bitcoin bridge and more," Blockchain: Research and Applications, Mar. 2023, 4(1):100118, 32 pages.
Van Dijk et al., "A theoretical framework for the analysis of physical unclonable function interfaces and its relation to the random oracle model," Journal of Cryptology, Aug. 2023, 36:35, 64 pages.
Zha et al., "A comparative study for the nuclear norms minimization methods," CoRR, Submitted on May 10, 2019, arXiv:1608.04517v4, 5 pages.
International Search Report and Written Opinion in International Appln. No. PCT/US2025/049572, mailed on Jan. 8, 2026, 20 pages.
International Search Report and Written Opinion in International Appln. No. PCT/US2025/049767, mailed on Dec. 30, 2025, 9 pages.
Kelkar et al., "Secure Poisson Regression," 31st USENIX Security Symposium, Aug. 10-12, 2022, Boston, 19 pages.
Mouchet et al., "Multiparty Homomorphic Encryption from Ring-Leaming-with-Errors," Popets, Jun. 16, 2021, 2021(4):291-311.
Sehrawat, "Privacy enhancing cryptographic constructs for cloud and distributed security," Dissertation for the degree of Doctor of Philosophy in Computer Science, University of Texas at Dallas, Dec. 2019, 24 pages.
Xue et al., "Efficient Multiplicative-to-Additive Function from Joye-Libert Cryptosystem and Its Application to Threshold ECDSA," ACM, Nov. 15, 2023, 16 pages.

* cited by examiner

SECURITY AND EFFICIENCY FOR MULTI-PARTY COMPUTATION WALLETS

CROSS-REFERENCE TO RELATED APPLICATION(S)

This application is a continuation application of and claims the benefit of priority to U.S. application Ser. No. 18/909,358, filed on Oct. 8, 2024, the contents of which is hereby incorporated by reference.

TECHNICAL FIELD

This specification generally relates to methods, systems, and devices for multi-party computation.

BACKGROUND

A multi-party computation (MPC) wallet protocol is a cryptographic protocol used in digital wallets to enhance security and privacy. MPC allows multiple parties to jointly compute a function over their respective inputs whilst keeping the inputs private. In the context of digital wallets, a private key is divided among the multiple parties such that individual parties do not have access to the full private key, but collectively the multiple parties can use the private key to perform operations such as signing transactions.

Some MPC wallet protocols use multiple to additive share conversion protocols to distribute and reconstruct private keys. For example, assume that two parties hold respective secret shares of the private key, where the shares are referred to as multiplicative shares since when the shares are multiplied together, they equal the private key. The two parties can use a multiple to additive share conversion protocol to compute respective secret additive shares of the private key, e.g., random values that when added together equal the private key. Some multiple to additive share conversion protocols are based on additive homomorphic schemes, e.g., the Paillier cryptosystems, and require zero knowledge proofs, e.g., range proofs.

SUMMARY

This specification describes systems and methods for multiplicative to additive share conversions in multi-party computation (MPC) wallet protocols.

In general, innovative aspects of the subject matter described in this specification can include actions of generating, by a first party in possession of a first secret value, a graded encoding for the first secret value using a first learning with errors (LWE) instance that comprises the first secret value; receiving, by the first party and from a second party in possession of a second secret value, a graded encoding for the second secret value, wherein the secret is equal to a product of the first secret value and the second secret value; computing, by the first party, a product of: the graded encoding for the second secret value, the graded encoding for the first secret value, and a first public matrix generated by or assigned to the first party, wherein the product comprises a second additive secret value and forms a second LWE instance; computing, by inverting the second LWE instance, a first additive secret value, wherein the secret is equal to a sum of the first additive secret value and the second additive secret value; and performing, by the first party, a cryptographic operation in an MPC wallet protocol using the first additive secret value. Other implementations of this aspect include corresponding systems, apparatus, and computer programs, configured to perform the actions of the methods, encoded on computer storage devices.

These and other implementations can each optionally include one or more of the following features, alone or in combination: the first LWE instance can be given by a sum of i) a product of a second public matrix and the first secret value, and ii) a first LWE error matrix, wherein the second public matrix comprises a matrix generated by or assigned to the second party. The first LWE instance can be equal to a product of the graded encoding for the first secret value and a first public matrix, wherein the first public matrix comprises a matrix generated by or assigned to the first party. The second LWE instance can include a product of: the first public matrix and a sum of i) the second secret value multiplied by the first secret value and ii) an element of a ring used to sample the first and second secret values multiplied by the graded encoding for the first secret value multiplied by the first public matrix, added to a second LWE error matrix. The graded encoding for the second secret value can be generated using i) a third LWE instance that comprises the second secret value and ii) an element of a ring used to sample the first secret value and the second secret value. The third LWE instance can be equal to a sum of i) a product of the first public matrix and the second secret value, and ii) a third LWE error matrix. A product of the graded encoding for the second secret value and a second public matrix generated by or assigned to the second party can be equal to a sum of: a) the third LWE instance and b) a product of the first public matrix, the element of the ring used to sample the first secret value and the second secret value, and the second public matrix. The second additive secret value can be equal to a negative product of: an element of a ring used to sample the first secret value and the second secret value, the graded encoding of the first secret value, and the first public matrix. The first additive secret value can be equal to a sum of i) the second secret value multiplied by the first secret value and ii) an element of a ring used to sample the first and second secret values multiplied by the graded encoding for the first secret value multiplied by the first public matrix. The method can further comprise sending, by the first party, the graded encoding for the first secret value to a second party that possesses a second secret value. The method can further comprise receiving, by the second party, the graded encoding for the first secret value; computing, by the second party, a Hamming weight of a product of the graded encoding for the first secret value and the first public matrix; determining, by the second party, whether the Hamming weight is smaller than a predetermined threshold value; and in response to determining that the Hamming weight is larger than or equal to the predetermined threshold value, generating, by the second party, the graded encoding for the second secret value. The predetermined threshold value is based on an infinity norm of errors for the first LWE, wherein the errors are within $[-p/4, p/4)$ and p represents a modulus of a ring used to sample the first and second secret values. The method can further comprise sampling, by the first party, the first secret value from a predetermined ring of matrices; generating, by the first party, the first public matrix and a trapdoor of the first public matrix; and publishing, by the first party, the first public matrix. The cryptographic operation can include signing a transaction.

In general, other innovative aspects of the subject matter described in this specification can include actions of receiving, by a second party in possession of a second secret value and from a first party in possession of a first secret value, a graded encoding of the first secret value; generating, by a second party in possession of a second secret value, a graded encoding for the second secret value using i) a first learning with errors (LWE) instance that comprises the second secret value and ii) a product of a first public matrix generated by or assigned to a first party in possession of a first secret value, a matrix sampled from a ring of matrices used by the graded encoding, and a second public matrix generated by or assigned to the second party; setting, by the second party, a second additive share of the secret as equal to minus a product of: the matrix sampled from a ring of matrices used by the graded encoding, the graded encoding of the first secret value, and the first public matrix; and sending, by the second party, the graded encoding for the second secret value to the first party, wherein the first party computes a first additive secret value by inverting a second LWE instance obtained by multiplying the graded encoding for the second secret value, the graded encoding for the first secret value, and the first public matrix. Other implementations of this aspect include corresponding systems, apparatus, and computer programs, configured to perform the actions of the methods, encoded on computer storage devices.

These and other implementations can each optionally include computing, by the second party, a Hamming weight of a product of the graded encoding for the first secret value and the first public matrix; determining, by the second party, whether the Hamming weight is smaller than a predetermined threshold value; and in response to determining that the Hamming weight is larger than or equal to the predetermined threshold value, generating, by the second party, the graded encoding for the second secret value.

Some implementations of the subject matter described herein may realize, in certain instances, one or more of the following advantages.

Many MPC wallet protocols require multiplicative to additive share conversion phases to increase the complexity of the protocols and improve security. However, known multiplicative to additive share conversion protocols typically require a large number of range proofs and Schnorr-like zero knowledge (ZK) proofs, which is computationally costly and reduces the performance of the MPC wallet. Attempts have been made to improve the performance of MPC wallets, however these previous attempts largely failed due to cryptographic vulnerabilities that were introduced by the optimizations performed.

Examples of the presently described multiplicative to additive share conversion protocols can improve on known protocols in several ways. For example, the presently described multiplicative to additive share conversion protocols do not require the costly and often times vulnerable range proofs. Accordingly, MPC wallet performance and security can be improved.

In addition, many known MPC wallet implementations use the Paillier cryptosystem whose modulus can never be compatible with ECDSA (Elliptic Curve Digital Signature Algorithm). Due to this modulus mismatch, such schemes rely on the problematic range proofs for the MtA phases and need Schnorr like (ZK) proofs for the distributed key generation phase. Almost all critical attacks on MPC wallets have exploited Paillier and/or the proofs it necessitates. However, examples of the presently described multiplicative to additive share conversion protocols resolve this issue by providing a protocol that does not rely on Paillier for (partially) homomorphic properties. The techniques are therefore compatible with a larger number of digital signature algorithms, e.g., ECDSA.

In addition, unlike the MtA protocols used in existing implementations of MPC wallets—that are used by a large number of users—the presently described protocols are post-quantum secure.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a MtA share conversion protocol for converting multiplicative secret values, e.g., shares of a secret, to respective additive secret values, e.g., as party of an MPC wallet protocol. The protocol uses a graded encoding scheme for homomorphic properties and therefore avoids costly and vulnerable range proofs and is compatible with digital signature algorithms such as ECDSA.

In some implementations, actions include generating, by a first party in possession of a first secret value, a graded encoding for the first secret value using a first learning with errors (LWE) instance that comprises the first secret value; receiving, by the first party and from a second party in possession of a second secret value, a graded encoding for the second secret value, wherein the secret is equal to a product of the first secret value and the second secret value; computing, by the first party, a product of: the graded encoding for the second secret value, the graded encoding for the first secret value, and a first public matrix generated by or assigned to the first party, wherein the product comprises a second additive secret value and forms a second LWE instance; computing, by inverting the second LWE instance, a first additive secret value, wherein the secret is equal to a sum of the first additive secret value and the second additive secret value; and performing, by the first party, a cryptographic operation in an MPC wallet protocol using the first additive secret value.

In some implementations, actions include receiving, by a second party in possession of a second secret value and from a first party in possession of a first secret value, a graded encoding of the first secret value; generating, by a second party in possession of a second secret value, a graded encoding for the second secret value using i) a first learning with errors (LWE) instance that comprises the second secret value and ii) a product of a first public matrix generated by or assigned to a first party in possession of a first secret value, a matrix sampled from a ring of matrices used by the graded encoding, and a second public matrix generated by or assigned to the second party; setting, by the second party, a second additive share of the secret as equal to minus a product of: the matrix sampled from a ring of matrices used by the graded encoding, the graded encoding of the first secret value, and the first public matrix; and sending, by the second party, the graded encoding for the second secret value to the first party, wherein the first party computes a first additive secret value by inverting a second LWE instance obtained by multiplying the graded encoding for the second secret value, the graded encoding for the first secret value, and the first public matrix.

Figure 1:
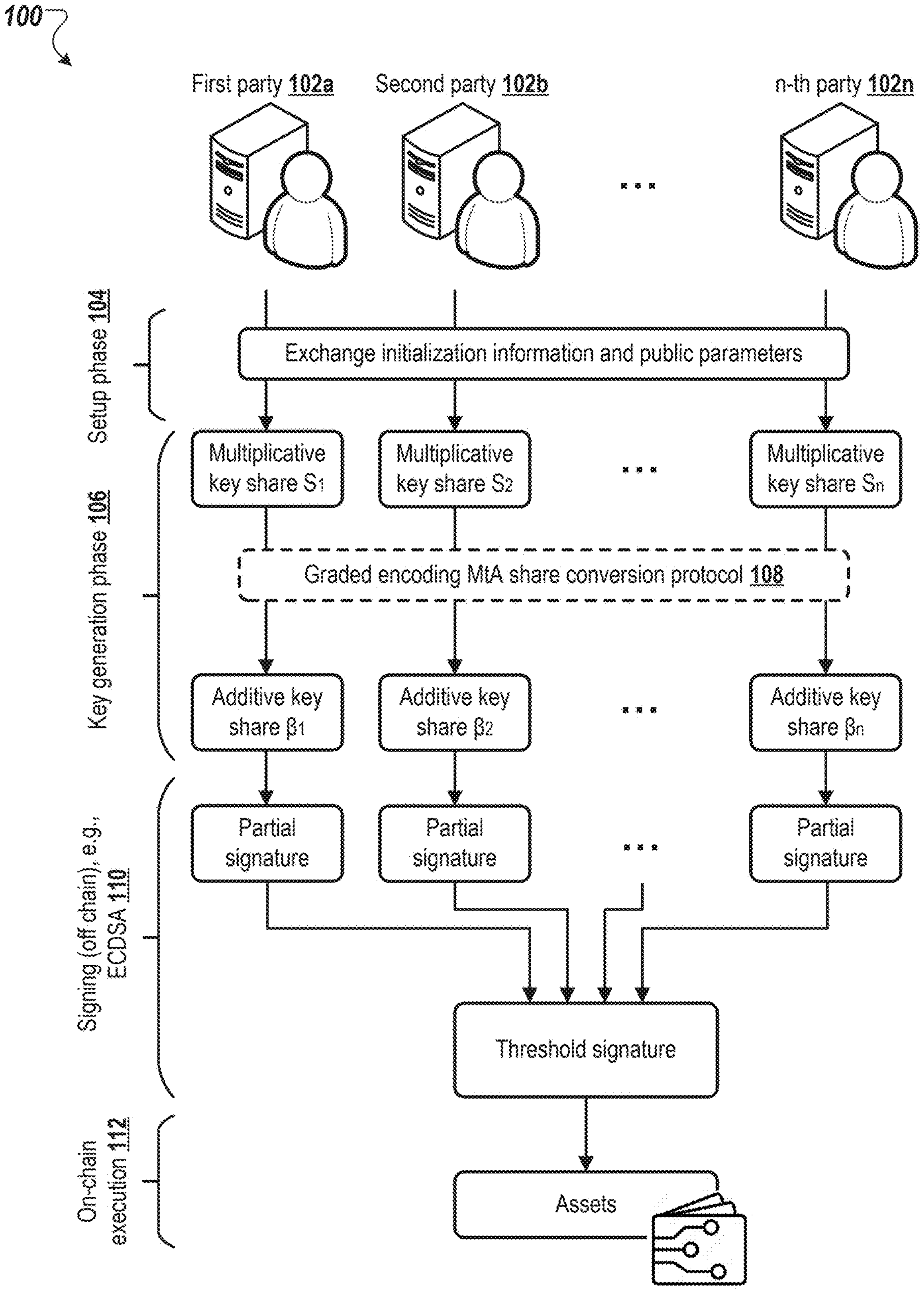
FIG. 1 is a block diagram of an example MPC wallet system during an implementation of a MPC wallet protocol.

FIG. 1 is a block diagram of an example MPC wallet system 100 during implementation of a MPC wallet protocol. The example MPC wallet system 100 includes multiple parties 102*a-n*. Each party of the multiple parties 102*a-n* is a computing system that can be implemented as one or more computer programs executed by one or more computers in one or more locations.

Each party of the multiple parties 102*a-n* communicates with other parties to securely share data. In some implementations, the multiple parties 102*a-n* can be configured to communicate directly with one another over secure communication channels, e.g., using encrypted communication channels established via a secure communication protocol such as transport layer security. Alternatively or in addition, the multiple parties 102*a-n* can be configured to communicate via broadcast channels where information, e.g., public parameters or initialization information, are published to all parties in the system. Alternatively or in addition, the multiple parties 102*a-n* can be in communication with a central server that acts an intermediary and relays messages between parties whilst ensuring secure and authenticated communication. In these implementations, the central server does not have access to private key shares, secret values, or other sensitive information.

During a setup phase 104 of the example MPC wallet protocol, the multiple parties 102*a-n* exchange initialization information and public parameters using one of the above described methods of communication. During a secret value generation phase 106, each party of the multiple parties 102*a-n* independently generates one or more secret values. In some implementations, the secret values can include a private share of a private key, e.g., first party 102*a* can generate a key share $S_1$, second party 102*b* can generate a key share $S_2$, etc. In these implementations the key shares generated by the multiple parties 102*a-n* are referred to as multiplicative key shares since a product of the key shares is equal to the private key, e.g., $$S_1 S_2 \ldots S_n = S. \tag{1}$$

In other implementations, e.g., in threshold ECDSA, the secret values include deterministic or randomized derivatives of private key shares and random nonces. For example, the first party 102*a* can generate a key share $S_1$ (or a derivative of $S_1$) and a nonce $k_1$. Similarly, the second party 102*b* can generate a key share $S_2$ (or a derivative of $S_2$) and a nonce $k_2$.

To enhance security and privacy in the MPC wallet system, during the secret value generation phase 106, the multiple parties 102*a-n* perform a multiplicative to additive (MtA) share conversion protocol to convert their respective multiplicative secret values to additive secret values. For example, in some implementations the first party 102*a* performs the MtA share conversion protocol to convert their multiplicative share $S_1$ to an additive key share $\beta_1$, second party 102*b* performs the MtA share conversion protocol to convert their multiplicative share $S_2$ to an additive key share $\beta_2$, etc. The converted key shares are referred to as additive key shares since a summation of the converted key shares is equal to the private key, e.g., $$\beta_1 + \beta_2 + \cdots + \beta_n = S_1 S_2 \ldots S_n = S. \tag{2}$$

In other implementations, pairs of parties can generate respective additive secret values. For example, the first party 102*a* can perform the MtA share conversion protocol to compute $S'_1 k_2 = \beta_1 + \beta_2$ and/or the second party 102*b* can perform the MtA share conversion protocol to compute $S'_2 k_1 = \alpha_1 + \alpha_2$ where $S'_j$ can be equal to $S_j$ or can be a deterministic or randomized derivative of $S_j$. In these implementations, parties cannot generate the additive secret values individually—they can only be generated in collaboration with each other—and MtA for more than two parties is performed pairwise.

The MtA share conversion protocol performed by the multiple parties 102*a-n* uses graded encodings of the multiplicative secret values, and is referred to herein as a graded encoding MtA share conversion protocol 108. During the graded encoding MtA share conversion protocol, multiplicative secret values are encoded as learning with error (LWE) secrets such that addition and multiplication of the graded encodings correspond to addition and multiplication of the LWE secrets, respectively. This enables the multiplicative secret values to be securely and correctly converted to additive secret values, where the security and correctness follows from the hardness of LWE and properties of trapdoor functions. The graded encoding MtA share conversion protocol is described in more detail below with reference to FIGS. 3-5.

During a signing phase 110 of the example MPC wallet protocol, each party of the multiple parties 102*a-n* uses its additive secret values to generate a partial signature, e.g., according to an ECDSA algorithm. The partial signatures can then be broadcast so that each party shares its partial signature with the other parties. One party of the multiple parties 102*a-n* can then be allocated the task of combining a threshold number of the partial signatures to generate a threshold signature that can be used in an on-chain execution phase 112 to complete a transaction.

Figure 2:
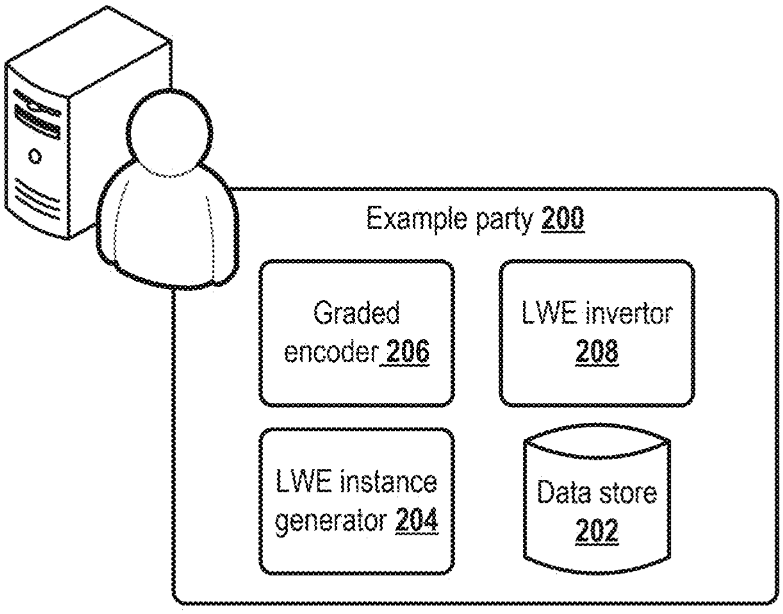
FIG. 2 is a block diagram of an example party in a MPC system.

FIG. 2 is a block diagram of an example party 200 in the MPC wallet system 100 of FIG. 1. As discussed above with reference to FIG. 1, the example party 200 is a computing system that can be implemented as one or more computer programs executed by one or more computers in one or more locations. The example party 200 includes a data store 202, a graded encoder 204, a LWE instance generator 206, and a LWE invertor 208. These computing components can be connected over a network (e.g., LAN, WLAN, the Internet, or a combination thereof), which can be accessed over a wired and/or a wireless communications link.

The data store 202 is configured to store data used during an MPC wallet protocol, e.g., initialization information, public parameters such as the public matrices and trapdoors described below with reference to FIG. 3, and secret values generated by the party 200, e.g., multiplicative shares or additive shares.

The LWE instance generator 204 is configured to generate LWE instances required by the graded encoding MtA share conversion protocol. A LWE problem can be formulated as the task of recovering a secret $$s \in Z_q^n$$

given a matrix A and LWE instance $A \cdot S+E$, where $$A\$ \leftarrow Z_q^{m\times n},\ s\$ \leftarrow Z_q^n,$$

and E $\$\leftarrow\chi^m$ where $\chi^m$ is an error probability distribution over $Z_q$. Example operations performed by the LWE instance generator 204 and LWE instances generated by the LWE instance generator 204 are described in more detail below with reference to FIGS. 3-5.

The graded encoder 206 is configured to generate graded encodings of multiplicative secret values generated by the party 200 using a graded encoding scheme. The graded encoding scheme operates over an algebraic plaintext ring R and enables elements of the ring to be encoded and subsequently manipulated. In particular, the graded encoding scheme encodes LWE secrets in square matrices of higher dimensions. Addition and multiplication of the encodings then corresponds to addition and multiplication of the LWE secrets.

The plaintext space of the graded encoding is the non-commutative ring of matrices $$R \in Z_q^{n\times n}$$

(a ring of n×n matrices whose entries are elements of a finite field with q elements, where the field consists of the integers modulo q meaning that all arithmetic operations are performed modulo q). The construction is parametrized by a directed acyclic graph G=(V,E) with diameter d. A matrix $$A_v\$ \leftarrow Z_q^{m\times n}$$

is associated with each node $v \in V$, and encodings in the scheme are defined relative to the paths in G. A plaintext matrix $S \in R$ is encoded with respect to a path $u \rightsquigarrow v$ via another small matrix $$D \in Z_q^{m\times n},$$

such that $D \cdot A_u \approx A_v \cdot S$.

Given a trapdoor $\tau_u$ for matrix $A_u$ and an error distribution $\chi = D_{Z,z}$, the graded encoding scheme generates an encoding D for S with respect to a source u and sink v, such that: $D \cdot A_u = A_v \cdot S+E$, where $E \leftarrow (\chi)^{m\times n}$ is an LWE error matrix. Since the trapdoor is given for $A_u$ and not $A_v$, the LWE instance $\{A_v, B_v\ (=A_v \cdot S+E)\}$ can still be hard for appropriate parameters.

Under the graded encoding scheme, arithmetic operations are matrix operations in $$Z_q^{m\times n}.$$

Two encodings, $D_1$ and $D_2$, relative to the same path $u \rightsquigarrow v$ can be added, namely using $D_1 \cdot A_u = A_v \cdot S_1+E_1$ and $D_2 \cdot A_u = A_v \cdot S_2+E_2$ gives $(E_1+E_2) \cdot A_u = A_v(S_1+S_2)+E_1+E_2$ where the matrices $S_1+S_2$, $E_1+E_2$, and $E_1+E_2$ are still small, e.g., have entries within [−p/4, p/4) where p is the modulus of the underlying finite field. Encodings relative to paths $v \rightsquigarrow w$ and $u \rightsquigarrow v$ can be multiplied to obtain an encoding relative to path $u \rightsquigarrow w$, that is given $D_1 \cdot A_v = A_w \cdot S_1+E_1$ and $D_2 = A_v \cdot S_2+E_2$ gives $D_1 \cdot D_2 \cdot A_u = D_1 \cdot (A_v \cdot S_2+E_2) = A_w \cdot S_1 \cdot S_2+E'$, where the matrices $D_1 \cdot D_2$, $S_1 \cdot S_2$, and E' are still small. It can be shown that the largest E' computed by combining all encodings $D_i$ as $D_{l-1}D_{l-1} \ldots D_1A_1 = A_lS_lS_{l-1} \ldots S_1+E'$ has entries bounded by $O(\sqrt{d^{6l-11}\lambda^{4l-5}}(d\lambda))$ where d represents the diameter of the directed acyclic graph and λ represents a security parameter. This upper bound on the size of the error can be used to determine whether a given directed acyclic graph is suitable for the protocol or not.

Example operations performed by the graded encoder 204 are described in more detail below with reference to FIG. 3.

The LWE invertor 208 is configured to implement a LWE inversion algorithm, e.g., using trapdoors stored in the data store 202, to recover LWE secrets (and error matrices) from LWE instances. Example operations performed by the LWE invertor 208 are described in more detail below with reference to FIGS. 3-5.

Figure 3:
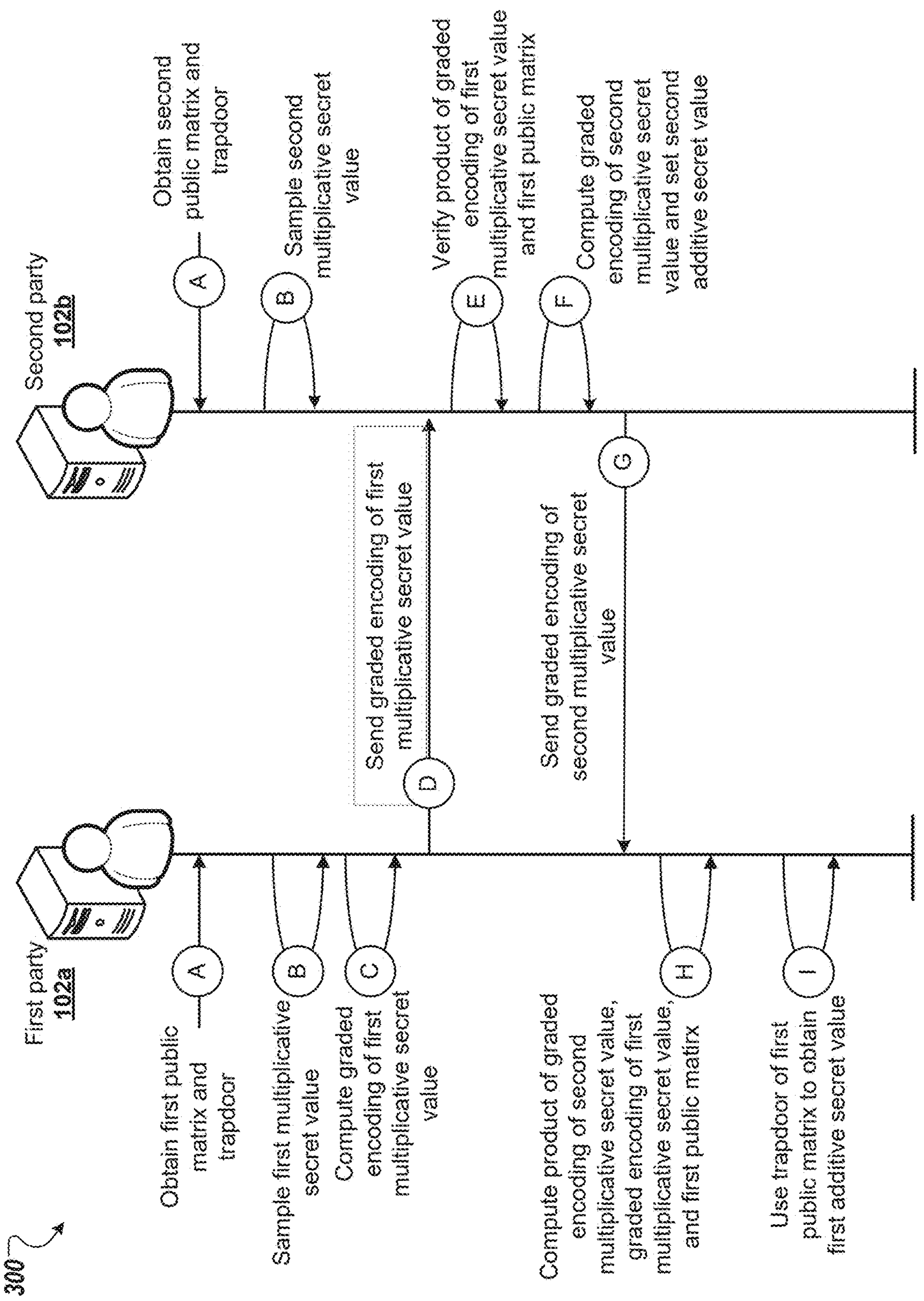
FIG. 3 is a block diagram of the example MPC wallet system during a multiplicative to additive share conversion protocol between two parties.

FIG. 3 is a block diagram of the example MPC wallet system of FIG. 1 during an example MtA share conversion protocol between two parties. The block diagram 200 illustrates the example MtA share conversion protocol as including stages (A)-(L). However, in some implementations, the example MtA share conversion protocol can include fewer or more stages.

During stage (A) of the example protocol, a first party obtains, e.g., generates or is assigned, a first public matrix $A_1$. The first public matrix $A_1$ is a matrix from a set of m×n matrices whose entries are elements of a finite field with p elements. That is, $$A_1 \in Z_p^{m\times n},$$

where n, m, and p are protocol parameters with values that are determined in advance and known to each party. The values of these parameters are chosen in advance such that the hardness of LWE is ensured, e.g., n can be chosen as polynomial in the size of a security parameter λ, m can be chosen as polynomial in m, and p is a prime number greater than 2.

The first party also generates or is assigned a trapdoor $\tau_1$ for the first pubic matrix $A_1$. A matrix $$\tau \in Z_q^{n \times md}$$

is a trapdoor with tag $$H \in Z_q^{m \times m}$$

for a matrix $$A \in Z_q^{m \times n}$$

with integers $n \geq md$ and $\underline{n}=n-md$ if $A[\tau I]=H \cdot G$, where $$G \in Z_q^{m \times md}$$

is a primitive matrix and the identity matrix I has dimension md×md. A trapdoor $\tau$ for matrix A can be used by a LWE inversion algorithm to successfully recover S (and E) with large probability from a LWE instance $B=AS+E \bmod q$.

Similarly, during stage (A), the second party obtains, e.g., generates or is assigned, a second public matrix $A_2$. The second public matrix $A_2$ is a matrix from the same set of m×n matrices as the first public matrix $A_1$. That is, $$A_2 \in Z_p^{m \times n}.$$

The second party also generates or obtains a trapdoor $\tau_2$ for the second pubic matrix. The first party and second party can each publish their respective public matrix $A_1$, $A_2$ such that the first party can access the second public matrix and the second party can access the first public matrix.

During stage (B), the first party samples a first secret value $S_1$ from a non-commutative ring R of n×n matrices whose entries are elements of a finite field with p elements. Similarly, the second party samples a second secret value $S_2$ from the same ring R of n×n matrices. In some implementations the first secret value $S_1$ and second secret value $S_2$ are multiplicative shares of a secret S in that a product of the multiplicative shares is equal to the secret, i.e., $S_1S_2=S$.

During stage (C), the first party uses the first public matrix $A_1$ and second public matrix $A_2$ to compute a graded encoding $D_1$ for the first secret value $S_1$. In some implementations the first party can also use the trapdoor of the first public matrix to compute the graded encoding $D_1$. The graded encoding $D_1$ satisfies $$D_1 A_1 = A_2 S_1 + E_1, \tag{3}$$

where $E_1$ is an LWE error matrix sampled from an error probability distribution $\chi$ over $$Z_p^{m \times n}.$$

During stage (D) the first party sends the graded encoding $D_1$ to the second party.

During stage (E), the second party determines whether the Hamming weight of a product of the graded encoding $D_1$ received from the first party and the first public matrix $A_1$ generated by or assigned to the first party is smaller than a predetermined threshold. For example, since the infinity norm of the errors for LWE is always smaller than that of the public and secret matrices, if the Hamming weight of the encoding is in the range of the error's infinity norm, then the receiving party can safely reject the encoding because it indicates that a zero secret matrix was encoded. The upper limit for the infinity norm for the LWE error would depend on both the result stated above that state that the largest E' has entries bounded by $O(\sqrt{d^{6l-11}\lambda^{4l-5}(d\lambda)})$ and the fact that the total error must remain in the range $[-p/4, p/4)$.

If the second party determines that the Hamming weight of the product $D_1A_1$ is smaller than the predetermined threshold, the second party aborts the MtA share conversion protocol and reports the first party as potentially malicious. If the second party determines that the Hamming weight of the product $D_1A_1$ is not smaller than the predetermined threshold, the second party performs stage (F).

During stage (F), the second party uses the first public matrix $A_1$ and second public matrix $A_2$ to compute a graded encoding $D_2$ for the second secret value $S_2$. In some implementations the second party can also use the trapdoor of the second public matrix to compute the graded encoding $D_2$. The graded encoding $D_2$ satisfies $$D_2 A_2 = A_1 S_2 + E_2 + A_1 R A_2, \tag{4}$$

where $E_2$ is an LWE error matrix sampled from the same error probability distribution $\chi$ over $$Z_p^{m \times n}$$

and $R \in R$ is an element from the ring R of n×n matrices used during stage (B).

During stage (F), the second party also sets their additive secret value (the second secret value) as equal to a negative product of the element R, the graded encoding $D_1$, and the first public matrix $A_1$. That is, the second party sets $\beta_2=-RD_1A_1$.

During stage (G) the second party sends the graded encoding $D_2$ to the first party.

During stage (H), the first party uses the first public matrix $A_1$, the graded encoding $D_1$ for the first secret value $S_1$, and the graded encoding $D_2$ for the second secret value $S_2$ to compute an LWE instance $C_1$. The LWE instance $C_1$ is computed as a product $D_2(D_1A_1)$ and is equal to $$\begin{aligned} C_1 &= D_2(D_1 A_1) \\ &= D_2(A_2 S_1 + E_1) \\ &= A_1 S_2 S_1 + A_1 R A_2 S_1 + E_2 S_1 + D_2 E_1 \\ &= A_1 S_2 S_1 + A_1 R D_1 A_1 + E_2 S_1 + D_2 E_1 - A_1 R E_1 \\ &= A_1(S_2 S_1 + R D_1 A_1) + E' \end{aligned} \tag{5}$$

where line 3 uses Equation (3) and the error $E'=E_2S_1+(D_2-A_1R)E_1$ remains small, e.g., has entries within [−p/4, p/4) where p is the modulus of the underlying finite field. During stage (I), the first party uses the trapdoor $\tau_1$ of the first pubic matrix in an LWE inversion algorithm to compute $\beta_1=S_2S_1+RD_1A_1$. Since the second party set the second additive secret value as $\beta_2=-RD_1A_1$, the sum of the additive secret values is equal to the product of the first secret value and the second secret value:

$$\beta_1+\beta_2=S_2S_1. \quad (7)$$

The first party and second party can then use their additive secret values, e.g., in a signing phase of a MPC wallet protocol. In some cases it can be beneficial to replace the results of the MtA share conversion protocol (which are in matrix form) with integer values, e.g., by taking the determinant of the product of the multiplicative secret values to extract random integers.

Figure 4:
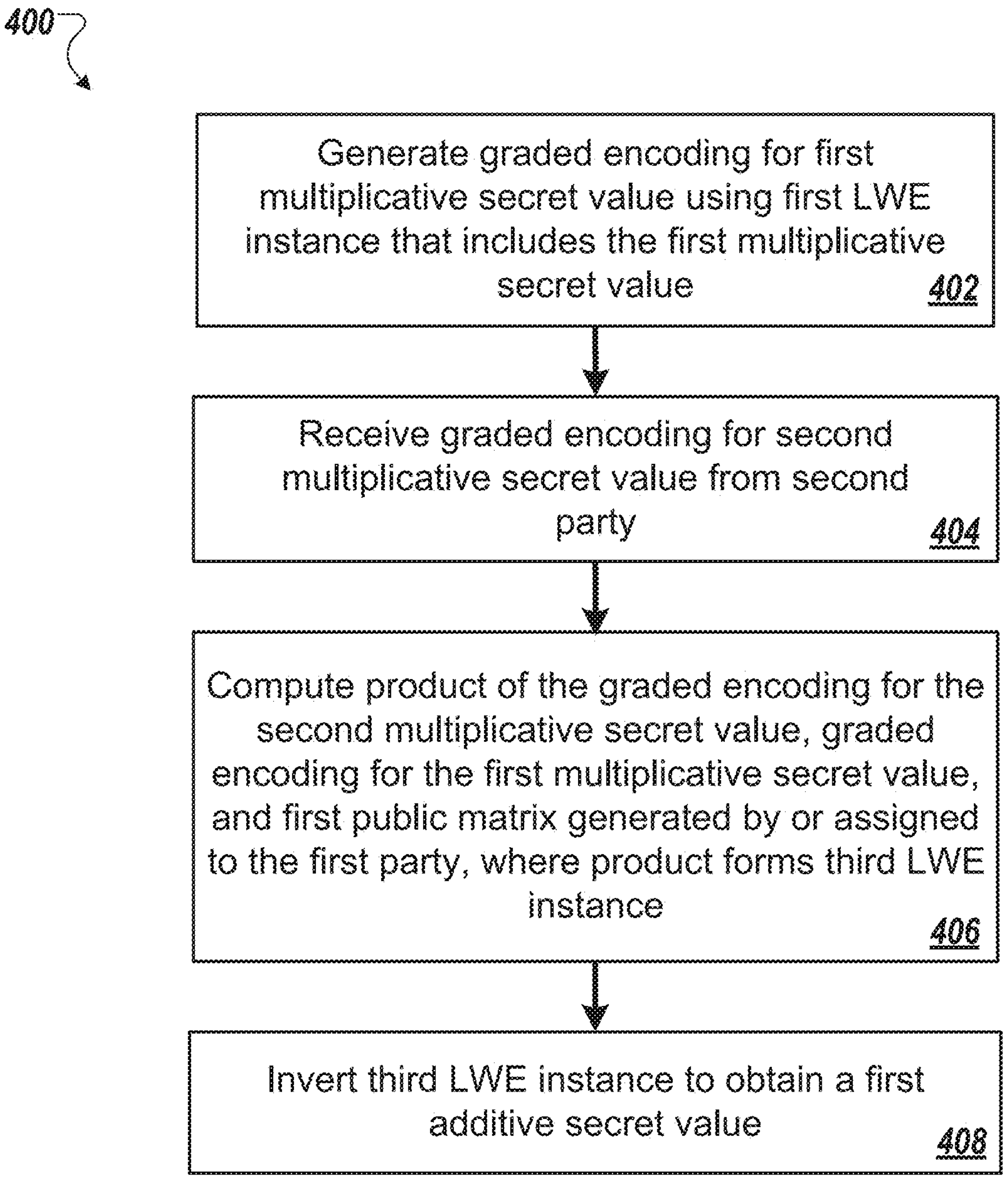
FIG. 4 is a flowchart of an example process performed by a first party for multiplicative to additive share conversion between two parties.

FIG. 4 is a flowchart of an example process 400 example process performed by a first party for graded encoding multiplicative to additive share conversion between two parties—a first party in possession of a first secret value and a second party in possession of a second secret value. In some implementation the first secret value and second secret values are private key shares of a secret, where the secret is equal to a product of the first secret value and the second secret value. In other implementations the secret values can be derivatives of private key shares and/or random nonces.

For convenience, the process 400 will be described as being performed by a first party using a system of one or more computers located in one or more locations. For example, the first party 102*a* of FIG. 1, appropriately programmed, can perform example process 400. Although the flowchart depicts the various stages of the process 400 occurring in a particular order, certain stages may in some implementations be performed in parallel or in a different order than what is depicted in the example process 400 of FIG. 4.

As discussed above, the first party in possession of a first secret value and the second party is in possession of a second secret value. The first party and second party are also in possession of or have access to a first public matrix (and its trapdoor) and a second public matrix (and its trapdoor). For example, during a setup phase, each of the first party and second party can generate and publish a respective public matrix and its trapdoor.

The first party generates a graded encoding for the first secret value using a first LWE instance that includes the first secret value (step 402). The first LWE instance is a sum of i) a product of a second public matrix and the first secret value, and ii) a first LWE error matrix, where the second public matrix includes a matrix generated by or assigned to the second party. The first LWE instance is equal to a product of the graded encoding for the first secret value and a first public matrix, where the first public matrix comprises a matrix generated by or assigned to the first party, as described above with reference to Equation (3).

The first party sends the graded encoding for the first secret value to the second party. In response, the second party verifies the security of the graded encoding by computing a Hamming weight of a product of the graded encoding for the first secret value and the first public matrix. The second party determines whether the Hamming weight is smaller than a predetermined threshold value. In response to determining that the Hamming weight is larger than or equal to the predetermined threshold value, the second party generates the graded encoding for the second secret value and sends the graded encoding for the second secret value to the first party. Conversely, in determining that the Hamming weight is smaller than the predetermined threshold value, the second party aborts example process 300.

The first party receives the graded encoding for the second secret value from the second party (step 404). The graded encoding for the second secret value is generated by the second party using i) a second LWE instance that comprises the second secret value and ii) an element (matrix) of the same ring used to sample the first and second secret values. The second LWE instance is equal to a sum of i) a product of the first public matrix and the second secret value, and ii) a second LWE error matrix, as shown in Equation (4) above. A product of the graded encoding for the second secret value and a second public matrix generated by or assigned to the second party is equal to a sum of: a) the second LWE instance and b) a product of the first public matrix, the element of the same ring used to sample the first and second secret values, and the second public matrix.

The first party computes a product of: the graded encoding for the second secret value, the graded encoding for the first secret value, and the first public matrix generated by or assigned to the first party (step 406). The product forms a third LWE instance, as shown in Equation (5) above.

The first party uses the trapdoor of the first public matrix to obtain a first additive share of the secret from the third LWE instance (step 408).

Figure 5:
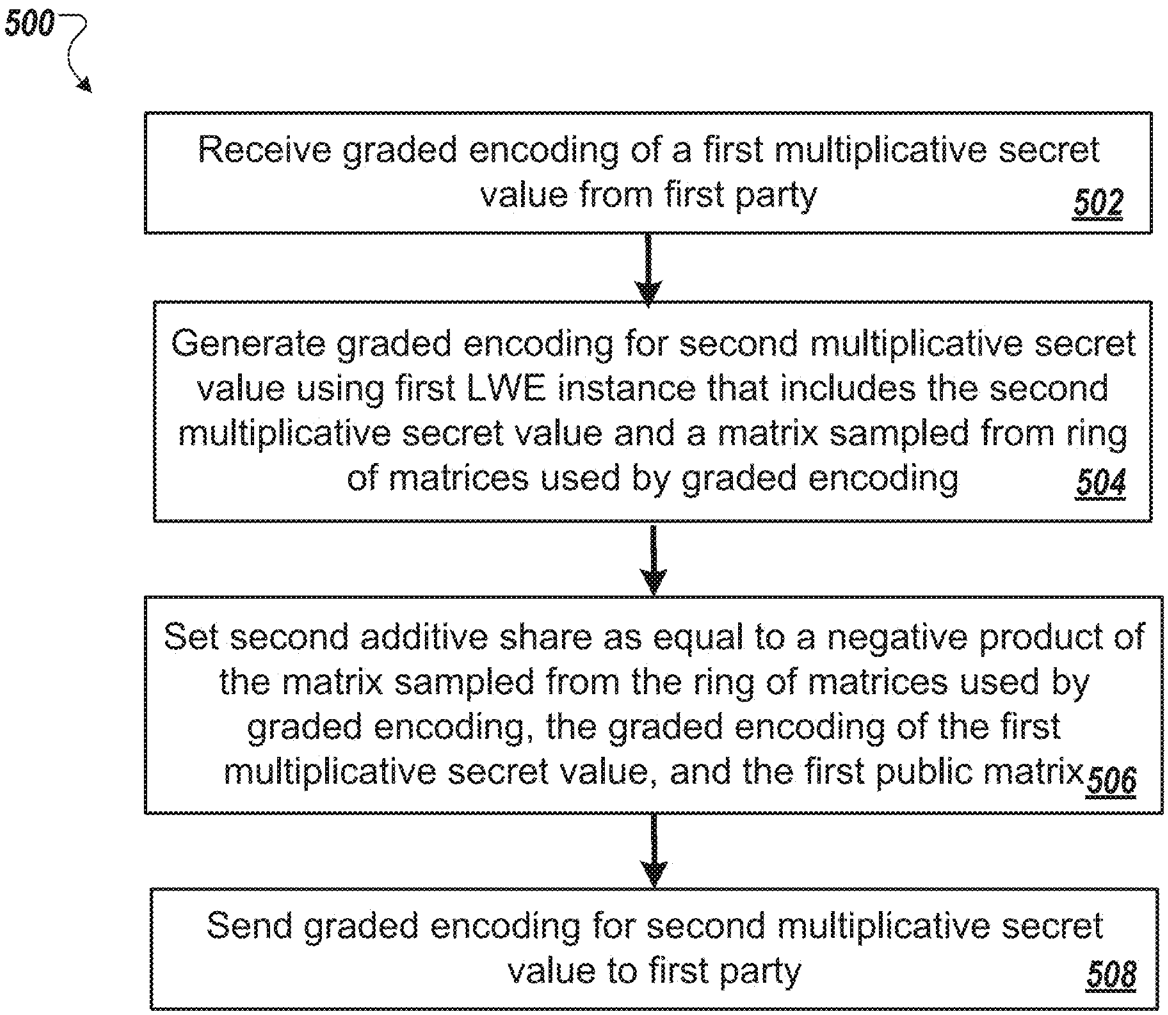
FIG. 5 is a flowchart of an example process performed by a second party for multiplicative to additive share conversion between two parties.

FIG. 5 is a flowchart of an example process 500 performed by a second party for graded encoding multiplicative to additive share conversion between two parties—a first party in possession of a first secret value and a second party in possession of a second secret value. In some implementations the first secret value and second secret value are private key shares of a secret, where the secret is equal to a product of the first multiplicative share and the second multiplicative share. In other implementations the secret values can be derivatives of private key shares and/or random nonces.

For convenience, the process 500 will be described as being performed by a second party using a system of one or more computers located in one or more locations. For example, the second party 102*b* of FIG. 1, appropriately programmed, can perform example process 500. Although the flowchart depicts the various stages of the process 500 occurring in a particular order, certain stages may in some implementations be performed in parallel or in a different order than what is depicted in the example process 500 of FIG. 5.

As discussed above, the first party in possession of a first secret value and the second party is in possession of a second secret value. The first party and second party are also in possession of or have access to a first public matrix (and its trapdoor) and a second public matrix (and its trapdoor). For example, during a setup phase, each of the first party and second party can generate a respective public matrix and its trapdoor, and publish the public matrix.

The second party receives a graded encoding of the first secret value from the first party (step 502). The graded encoding of the first secret value is described above with reference to Equation (3).

The second party generates a graded encoding for the second secret value using i) a first learning with errors (LWE) instance that includes the second secret value and ii)

a product of the first public matrix, a matrix sampled from a ring of matrices used by the graded encoding, and the second public matrix (step 504). The graded encoding for the second secret value is described above with reference to Equation (4).

In some implementations the second party performs step 504 in response to verifying the security of a graded encoding of a first secret value generated by the first party and the first public matrix generated by or assigned to the first party during the setup phase. For example, the second party can receive the graded encoding of the first secret value from the first party, access the first public matrix, and compute a Hamming weight of a product of the graded encoding for the first secret value and the first public matrix. The second party can determine whether the Hamming weight is smaller than a predetermined threshold value. If the Hamming weight is larger than or equal to the predetermined threshold value, the second party can perform step 504. However, if the Hamming weight is smaller than the predetermined threshold value, the second party can abort example process 400.

The second party sets a second additive share of the secret as equal to minus a product of: the matrix sampled from a ring of matrices used by the graded encoding, the graded encoding of the first secret value, and the first public matrix (step 506).

The second party sends the graded encoding for the second secret value to the first party (step 508). The first party computes a first additive share of the secret by inverting a second LWE instance obtained by multiplying the graded encoding for the second secret value, the graded encoding for the first secret value, and the first public matrix, as described above with reference to example process 400.

This specification uses the term "configured" in connection with systems and computer program components. For a system of one or more computers to be configured to perform particular operations or actions means that the system has installed thereon software, firmware, hardware, or a combination thereof that, in operation, cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method comprising:

generating, by a first party in possession of a first secret value, a graded encoding for the first secret value using a first learning with errors (LWE) instance that comprises the first secret value;

receiving, by the first party and from a second party in possession of a second secret value, a graded encoding for the second secret value, wherein the first secret value and the second secret value are multiplicative shares of a secret that is equal to a product of the first secret value and the second secret value;

computing, by the first party, a product of: the graded encoding for the second secret value, the graded encoding for the first secret value, and a first public matrix generated by or assigned to the first party, wherein the product comprises a second additive secret value and forms a second LWE instance;

computing, by inverting the second LWE instance, a first additive secret value, wherein the secret is equal to a sum of the first additive secret value and the second additive secret value; and performing, by the first party, a cryptographic operation in an MPC wallet protocol using the first additive secret value.

2. The method of claim 1, wherein the first LWE instance is given by a sum of i) a product of a second public matrix and the first secret value, and ii) a first LWE error matrix, wherein the second public matrix comprises a matrix generated by or assigned to the second party.

3. The method of claim 1, wherein the first LWE instance is equal to a product of the graded encoding for the first secret value and the first public matrix, wherein the first public matrix comprises a matrix generated by or assigned to the first party.

4. The method of claim 1, wherein the second LWE instance comprises a product of: the first public matrix and a sum of i) the second secret value multiplied by the first secret value and ii) an element of a ring used to sample the first and second secret values multiplied by the graded encoding for the first secret value multiplied by the first public matrix, added to a second LWE error matrix.

5. The method of claim 1, wherein the graded encoding for the second secret value is generated using i) a third LWE instance that comprises the second secret value and ii) an element of a ring used to sample the first secret value and the second secret value.

6. The method of claim 5, wherein the third LWE instance is equal to a sum of i) a product of the first public matrix and the second secret value, and ii) a third LWE error matrix.

7. The method of claim 5, wherein a product of the graded encoding for the second secret value and a second public matrix generated by or assigned to the second party is equal to a sum of: a) the third LWE instance and b) a product of the first public matrix, the element of the ring used to sample the first secret value and the second secret value, and the second public matrix.

8. The method of claim 1, wherein the second additive secret value is equal to a negative product of: an element of a ring used to sample the first secret value and the second secret value, the graded encoding of the first secret value, and the first public matrix.

9. The method of claim 1, wherein the first additive secret value is equal to a sum of i) the second secret value multiplied by the first secret value and ii) an element of a ring used to sample the first and second secret values multiplied by the graded encoding for the first secret value multiplied by the first public matrix.

10. The method of claim 1, further comprising sending, by the first party, the graded encoding for the first secret value to the second party.

11. The method of claim 10, wherein the method further comprises:

receiving, by the second party, the graded encoding for the first secret value;

computing, by the second party, a Hamming weight of a product of the graded encoding for the first secret value and the first public matrix;

determining, by the second party, whether the Hamming weight is smaller than a predetermined threshold value; and in response to determining that the Hamming weight is larger than or equal to the predetermined threshold value, generating, by the second party, the graded encoding for the second secret value.

12. The method of claim 11, wherein the predetermined threshold value is based on an infinity norm of errors for the first LWE, wherein the errors are within $[-p/4, p/4)$ and p represents a modulus of a ring used to sample the first and second secret values.

13. The method of claim 1, further comprising:

sampling, by the first party, the first secret value from a predetermined ring of matrices;

generating, by the first party, the first public matrix and a trapdoor of the first public matrix; and publishing, by the first party, the first public matrix.

14. The method of claim 1, wherein the cryptographic operation comprises signing a transaction.

* * * * *